(12) United States Patent
Ludois

(10) Patent No.: US 11,909,187 B2
(45) Date of Patent: Feb. 20, 2024

(54) AERIAL STATION POWER TETHER WITH UNIPOLAR CURRENT FLOW

(71) Applicant: Wisconsin Alumni Research Foundation, Madison, WI (US)

(72) Inventor: Daniel Ludois, Middleton, WI (US)

(*) Notice: Subject to any disclaimer, the term of this patent is extended or adjusted under 35 U.S.C. 154(b) by 371 days.

(21) Appl. No.: 17/395,620

(22) Filed: Aug. 6, 2021

(65) Prior Publication Data
US 2023/0043044 A1   Feb. 9, 2023

(51) Int. Cl.
| | |
|---|---|
| *H02G 11/02* | (2006.01) |
| *H01B 11/00* | (2006.01) |
| *H01B 11/22* | (2006.01) |
| *H02G 7/00* | (2006.01) |
| *H01Q 1/28* | (2006.01) |
| *B64F 3/02* | (2006.01) |
| *H02J 50/05* | (2016.01) |

(52) U.S. Cl.
CPC ............ *H02G 11/02* (2013.01); *B64F 3/02* (2013.01); *H01B 11/007* (2013.01); *H01B 11/22* (2013.01); *H01Q 1/28* (2013.01); *H02G 7/00* (2013.01); *H02J 50/05* (2016.02)

(58) Field of Classification Search
CPC .. H02G 11/02; H02G 7/00; B64F 3/02; H01B 11/007; H01B 11/22
See application file for complete search history.

(56) References Cited

U.S. PATENT DOCUMENTS

| | | | |
|---|---|---|---|
| 593,138 A | 11/1897 | Tesla | |
| 2019/0379226 A1* | 12/2019 | Syracuse | ............... H02J 50/001 |

* cited by examiner

*Primary Examiner* — Daniel Cavallari
(74) *Attorney, Agent, or Firm* — Boyle Fredrickson, SC

(57) ABSTRACT

A power tether for aerial devices such as balloons or drones operates with as few as a single conductor, providing a ground return by capacitive coupling between the aerial device and a ground plane at a base station. High-frequency, high-voltage power allows significant power transfer through the low capacitance between the aerial station and the ground minimizing the necessary current flow.

19 Claims, 4 Drawing Sheets

AERIAL STATION POWER TETHER WITH UNIPOLAR CURRENT FLOW

STATEMENT REGARDING FEDERALLY SPONSORED RESEARCH OR DEVELOPMENT

- - -

CROSS REFERENCE TO RELATED APPLICATION

- - -

BACKGROUND OF THE INVENTION

The present invention relates aerial stations and in particular to a power transmission system for providing power to aerial stations.

Aerial stations that can maintain a substantially stationary elevated position without supporting structure have a wide variety of potential uses, for example, supporting power harvesting devices such as solar cells or wind turbines, providing for long-distance radio, microwave, or optical transmitters, receivers or repeaters, or providing a platform supporting cameras or other instrumentation. Such aerial stations can make use of aerostats (lighter-than-air air balloons) or propeller-supported aircraft such as drones.

When an aerial station is used for power generation (for example, from wind turbines or solar cells) or an aerial station requires substantial power consumption (for example, for a radio transmitter or to provide power to propellers) a power tether may be used. The power tethers provide two or more electrical conductors to establish a continuous electrical circuit between the ground and the aerial station for power communication. The power tether also provides tensile strength elements such as rope fibers or cables to support the weight of the tether and possible tension loads from the aerial station. Example tether cables are commercially available from W. L. Gore & Associates providing a nylon braided outer jacket, multiple copper conductors and an optical fiber under the trade designation RCN9164.

Particularly in the case of propeller-supported aerial stations, the weight of the tether is a substantial concern. Ideally the gauge (areal cross-section) of the conductors is reduced to limit their weight but this can detrimentally increase conductor resistance over the long tether length. Higher voltages could allow smaller conductors to convey comparable power but such voltages require additional electrical insulation that substantially increases cable weight, bulk, and stiffness.

SUMMARY OF THE INVENTION

The present invention provides an aerial tether with reduced weight, bulk and stiffness by providing only unipolar current flow with as few as a single conductor. Unipolar current flow in this context means that in any instant in time the current flowing through the tether is in only a single direction. By eliminating the two conductors required for bipolar current flow (opposing current flows at each instant in time), not only is the size and weight of the conductor reduced, but higher voltages can be used without any or significant electrical insulation. This is because there is no longer a risk of a conductor-to-conductor shorting. Unipolar current flow is possible by using capacitive coupling between the aerial station and a ground plane (for example, the earth supporting a base station) for the return conductor, an approach made practical by using an alternating current power boosted to high voltages at the aerial station.

Importantly, the inventor has recognized that the normal problems of parasitic capacitances to ground, such as cause power loss in terrestrial wireless transmissions, can be enlisted for power transfer in an aerial station by integrating the ground plane into the current flow circuit. The remaining parasitic capacitances between the aerial station and the aerial tether are minor, substantially limited by the small area of the aerial tether. The amount of capacitive coupling between the aerial station and the ground will be largely independent of the altitude because of the potentially extremely large size of the ground plane (approximating an infinite plane).

Specifically, in one embodiment, the invention provides an aerial tether system having a terrestrial station providing connection to a ground plane and an aerial station providing self-supported flight including a supported capacitor plate structure providing a capacitively coupled path to the ground plane. An electrical load is positioned on one of the aerial station and terrestrial station, and an alternating current electrical power source is positioned on another of the aerial station and terrestrial station different from the location of the electrical load. A tether physically connects the aerial station and terrestrial station and provides a conductor communicating therebetween such that the ground plane, capacitor plate structure, conductor, electrical load, and alternating current electrical power source together provide a continuous electrical circuit between the electrical load and electrical power source using the conductor and the capacitively coupled path.

It is thus a feature of at least one embodiment of the invention to provide a tether with unipolar current flow using capacitive coupling between the aerial station and the ground as a return conductor, thus greatly reducing the weight, bulk, and stiffness of the tether.

A voltage step-up circuit may be supported by the aerial station to boost the voltage between the tether and the capacitor plate structure.

It is thus a feature of at least one embodiment of the invention to boost the current flow through limited capacitive coupling between the aerial station and the ground by using high voltages. It is another feature of at least one embodiment of the invention to limit the necessary voltage on the tether by making a voltage boost at the aerial station safely away from the ground.

The step-up circuit may be a Tesla coil.

It is thus a feature of at least one embodiment of the invention to exploit the high-voltage step-up possible with a resonant transformer. It is another feature of the invention to eliminate the weight of an iron core transformer or the like.

A tap coil may be provided for inductive coupling with the Tesla coil to communicate with one of a load or power source.

It is thus a feature of at least one embodiment of the invention to provide a simple way of extracting tractable, lower voltage power for use by the aerial station.

The aerial tether system may further include a step-up transformer at the terrestrial station providing a secondary winding communicating between the ground plane and the conductor and a primary winding communicating with one of the load and power source.

It is thus a feature of at least one embodiment of the invention to provide distributed voltage boosting to reduce the demands on the aerial station.

The ground plane may be a conductor adapted for electrical communication with the Earth in the vicinity of the terrestrial station.

It is thus a feature of at least one embodiment of the invention to make use of the natural conductivity of soil or water to provide a large area ground plane.

The tether may include a fiber optic.

It is thus a feature of at least one embodiment of the invention to provide a data communication system that can run proximate to a high-voltage AC tether conductor without interference from that conductor.

The aerial tether system may further include a spool and spool mechanism for wrapping and unwrapping the tether around the spool, wherein the tether passes across an idler mechanism after leaving the spool providing electrical connection between the tether and a stationary load or source.

It is thus a feature of at least one embodiment of the invention to provide a simple spooling system allowing the tether to be extended for arbitrary distances and readily stored, it is another feature of at least one embodiment of the invention to permit tension control on the tether using a motor driven spool system.

The capacitor plate structure may be a metallized balloon skin.

It is thus a feature of at least one embodiment of the invention to employ a balloon structure of an aerostat to a large area capacitor plate.

These particular objects and advantages may apply to only some embodiments falling within the claims and thus do not define the scope of the invention.

DETAILED DESCRIPTION OF THE PREFERRED EMBODIMENT

Figure 1:
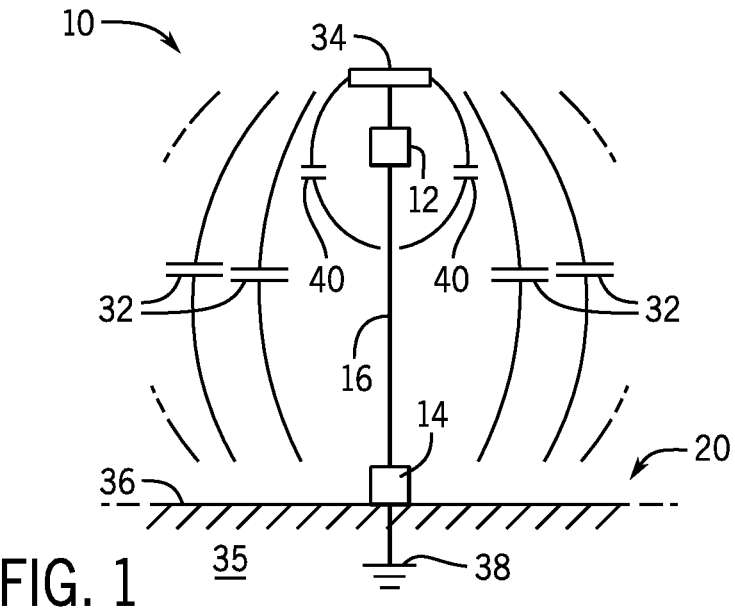
FIG. 1 is a schematic representation of the aerial tether of the present invention showing a conductive tether communicating between an aerial station and a base station and a capacitive return path for electrical current flow.

Referring now to FIG. 1, an aerial tether system 10 may provide an aerial station 12 communicating with a base station 14 by means of a conductive tether 16. Generally, the aerial station 12 will be self-supporting in the air above the ground 20, for example, by means of propellers or other reactive mechanisms or by buoyancy, for example, using a helium balloon or the like.

The tether 16 will be generally flexible requiring only tensile strength and thus potentially light and thin. Generally, the conductive tether provides not only a path of electrical flow but a physical connection between the aerial station 12 and the base station 14, the latter positioned on the ground. In this regard, the tether 16 may be pulled tight by the aerial station 12, for example, in the case of a lighter-than-air, aerial station 12, or may be loosely suspended under the aerial station 12, the latter having an independent altitude adjustment mechanism.

The tether 16 will provide a single conductive channel for unipolar current flow meaning that at any instant in time there is only single direction current flow through the tether 16. A single conductive channel may comprise multiple conductors each sharing this unipolar current flow, but allows the total cross-sectional area of the conductors in the tether 16 to be reduced under the reduced demands of unipolar current flow, thus also reducing the conductor weight for a given current flow and given power transmission. In one embodiment, the wire may be Litz wire providing multiple strands that reduce skin affect at high frequencies. This must be compared to prior art tethers providing two conductive channels having at any instant in time opposite current flow (bipolar current flow) typically through two or more wires. Note that unipolar current flow will be alternating current flow.

Figure 4:
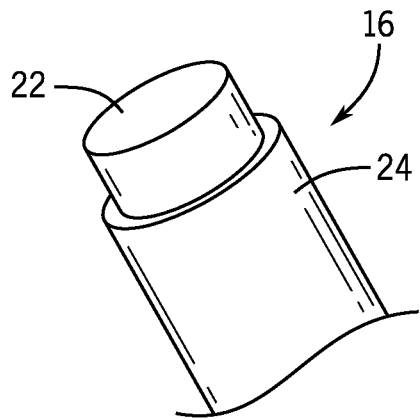
FIG. 4 is a fragmentary cutaway perspective view of one tether design having a conductive-material clad tensile core.

Referring to FIG. 4, the tether 16, for example, may provide a tensilely strong core 22, coated with a high conductivity material 24. Desirably the core 22 is a high specific strength material (being a function of tensile strength and weight) so as to support its own weight and loads that may be imposed by the aerial station 12 while being as light as practical. In this case, the core 22 may be a steel wire, having a specific strength of ~200 kN·m/kg clad with lower strength but more highly conductive copper (specific strength of ~20 kN·m/kg). It will be appreciated that no or only thin electrical insulation is necessary on the outside of the tether 16 since the normal voltage difference across a pair of conductors supporting bipolar current flow does not exist.

In an alternative design shown in FIG. 5, the tether 16 may be woven from multiple strands 26 of a high specific strength material, such as, for example, steel or Kevlar (specific strength of ~2500 kN·m/kg), with conductive copper filaments 28 incorporated therein, for example in a Litz configuration, and optionally an optical fiber 30 as will be discussed below.

In an alternative embodiment, it will be appreciated that the strands 26 may in themselves be conductive and of high specific strength eliminating the need for separate conductive filaments 28, for example, using carbon fiber or potentially continuous or semi-continuous carbon nanotubes.

Referring again to FIG. 1, the tether 16 provides one conductive leg of an electrical circuit for communicating power between the base station 14 and the aerial station 12. The remaining conductive leg (to provide a complete circuit between the base station 14 and the aerial station 12) may be provided by capacitive coupling through the air between a capacitor plate 34, supported by the aerial station 12, and a ground plane 36 communicating with the base station 14. This capacitive coupling 32 can be adapted for substantial power transmission by using alternating current power on the tether 16 at a high frequency and high voltage. In one embodiment, the invention uses AC power at above 1 MHz or, in another embodiment, may use AC power in the ISM bands to minimize interference with restricted radiofrequency communication frequencies. More generally, practical circuit constructions may use frequencies above 50 kHz.

The capacitor plate 34 will also provide capacitive parasitic coupling 40 between the capacitor plate 34 and the tether 16; however, the relatively thin size of the tether 16 presents a narrow capacitive plate substantially reducing this effect which would be counter to the general power flow between the base station 14 and the aerial station 12. In the creation of a complete circuit between the base station 14 and the aerial station 12, the current passing through the capacitive coupling 32 and parasitic coupling 40 will equal that passing through the tether 16.

Referring still to FIG. 1, in the simplest case, the ground plane may be conductive strata 35 of the Earth coupled to the base station 14 by means of a ground conductor 38, for example, a conductive matrix embedded in the strata 35 and electrically communicating between the base station 14 and the strata 35. It will be appreciated that the ground plane 36 may be large enough as to present essentially an infinite plane to the capacitor plate 34, largely eliminating the change in capacitive coupling as a function of altitude of the aerial station 12.

Figures 2A, 2B:
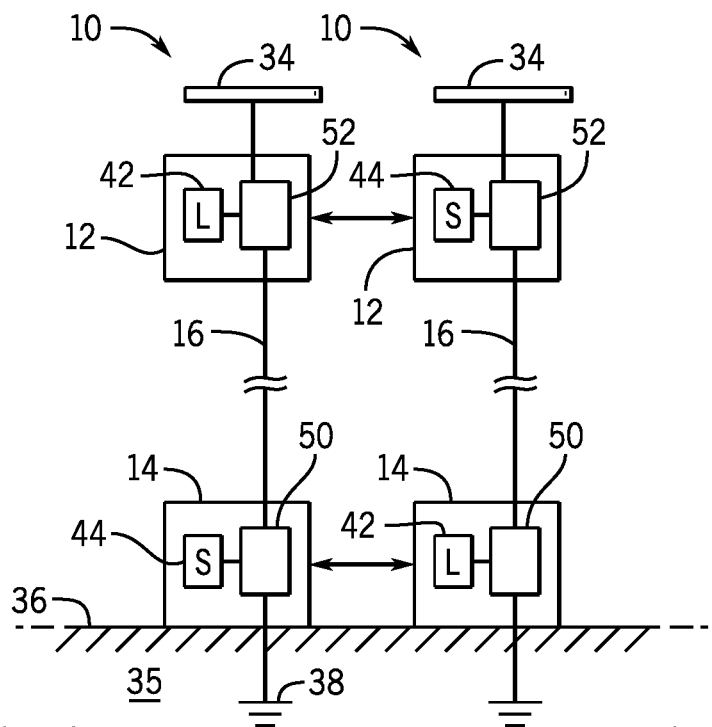
FIGS. 2a and 2b are expanded fragmentary views of the base station and aerial station of FIG. 1 as configured either for aerial loads (FIG. 2a) or aerial sources (FIG. 2b) showing a voltage boosting element in the aerial station.

Referring now also to FIG. 2a, it will be appreciated that the power may flow from the base station 14 to the aerial station 12, for example, to power equipment in the aerial station 12 including cameras, radios, and motors for driving propellers and the like, here represented as a load 42. In this case, the power source 44 will be located in the base station 14 and may be, for example, power from a generator or battery set or the like with appropriate circuitry to produce AC power at a desired high frequency as mentioned above. Alternatively, per FIG. 2b, the aerial station 12 may provide for a power source 44, for example, a wind turbine or solar cell array, to provide power through the tether 16 to the base station 14 which may provide for the load 42 consuming that power. It will be appreciated that both directions of power flow may be realized with the present invention which is generally not limited by power flow direction.

In some embodiments, the system tether 16 may operate with low current flow both consistent with the high impedance of the capacitive coupling 32 and allowing relatively high resistance conductive materials to be used in the tether 16 (for example, being intrinsically high-resistance materials or having small cross-sectional areas). This low current flow is accommodated by operating the tether 16 at a high voltage, for example, over 1000 V, using a step-up element 50 in the base station position between the tether 16 and either the source 44 or load 42. The step-up element 50 thus provides a high voltage on the tether 16 with respect to the ground conductor 38 and a higher voltage on the tether 16 than may be optimum for a load 42 or power source 44 in the base station 14.

Further, a step-up element 52 may be placed between the capacitor plate 34 and the tether 16 at the aerial station 12 to provide yet a higher voltage on the capacitor plate 34 with respect to the tether 16. This second step-up element 52 may provide, for example, in excess of 10 kV and even approach 1 million V at the capacitor plate 34. In order to reduce corona discharge at these voltages, the capacitor plate 34 may be free from sharp edges or points, for example, adopting a toroidal, ovoidal, spherical shape or the like.

It will be further understood from this description that power may be transmitted in both directions on the tether 16 at different times, for example, by placing both power sources 44 and loads 42 on both of the aerial platform 12 and base station 14 to be switched in and out as needed or by controlling the magnitude and phase between respective AC sources and inverter/loads operating in synchrony.

Figure 3:
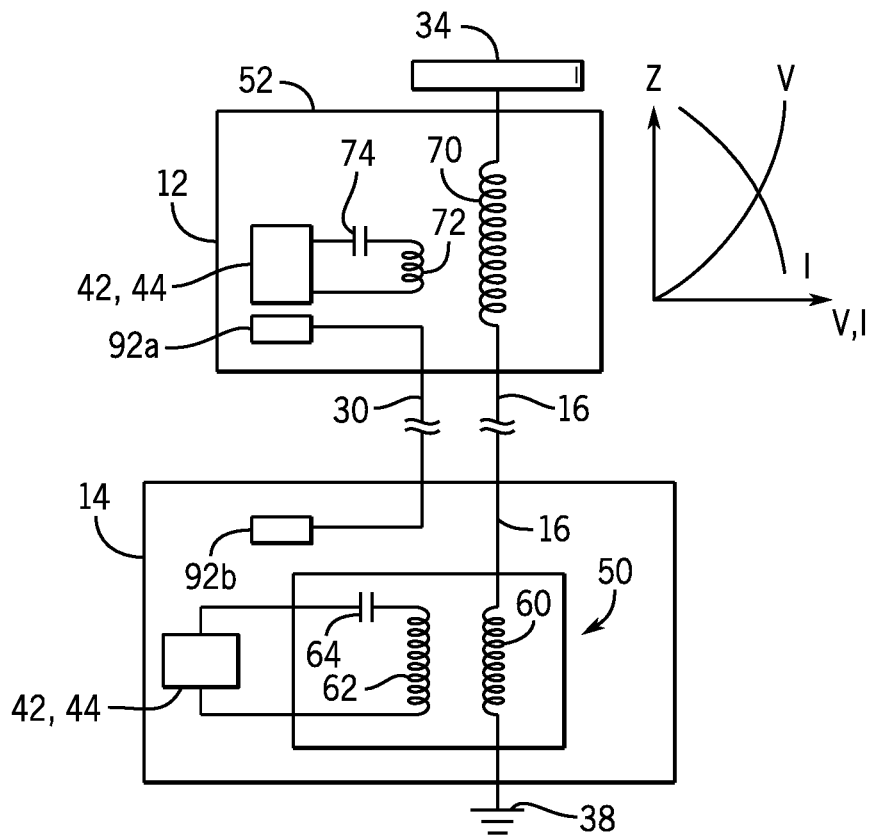
FIG. 3 is a schematic representation of one embodiment of a base station and aerial station showing a non-resonant transformer in the base station and a resonant air-core Tesla coil transformer in the aerial station providing the voltage boosting element of the aerial station.

Referring now to FIG. 3 the step-up element 50 may, for example, be a conventional non-resonant step-up transformer having a secondary coil 60 communicating between the tether 16 and the ground conductor 38 and a primary coil 62 communicating with either a load 42 or source 44 of electrical power. The primary coil 62 may have a series capacitor 64 so as to create a tank circuit operating at the desired frequency of the tether 16 and the source 44 will desirably produce an AC signal at this resonant frequency, while a load 42 will desirably provide processing circuitry, for example, rectification and filtering circuitry, to produce a DC signal from an AC signal on the primary coil 62 at the resonant frequency. This DC signal may then be modified, as is generally understood in the art to produce an arbitrary AC signal, if desired, for driving the load 42. Typically, the transformer formed by primary coil 62 and secondary coil 60 will provide a step-up of more than 5 and typically more than 20 and as much as 100 times voltage as dictated by its turns ratio.

At the aerial station 12, the tether 16 may be received by a Tesla coil 70 as part of a resonant transformer. In this regard, the Tesla coil 70 and capacitor plate 34 together may be tuned to one quarter of the wavelength of the frequency of AC current on the tether 16. This tuning boosts the voltage received on the terminal of the Tesla coil 70 from the tether 16 to a much higher level at the capacitor plate 34, reaching voltages over 50,000 V and potentially millions of volts limited primarily by a desire to prevent corona discharge. It will be appreciated that this resonant operation is caused by the transmission line—like distributed inductance and capacitance of the Tesla coil 70, for example, being a helical coil of wire having parasitic capacitances between the windings.

An air-core linked secondary coil 72 in the aerial station 12 may be used to tap into the Tesla coil 70 and may include a series capacitance 74 to be resonant with the frequency of the Tesla coil 70 and simultaneously cancel the leakage inductance of the secondary coil 72. It should be appreciated that this capacitance can be included in parallel with 72 or in various series/parallel combinations generally known as compensation networks to realize any desired impedance. This secondary coil 72 provides a step down or lower voltage compatible with either a source 44 or load 42 as discussed above. In the case of a source 44, source 44 may include appropriate power conditioning circuits (rectification, filtering, waveform synthesis, or the like) to bring the electrical power of an arbitrary source (AC or DC at various voltages) into the proper AC resonant frequency of the Tesla coil 70. In the case of a load, the high-frequency AC current from the Tesla coil 70 may be similarly power conditioned to provide arbitrary AC or DC power at a variety of voltages.

Figure 6:
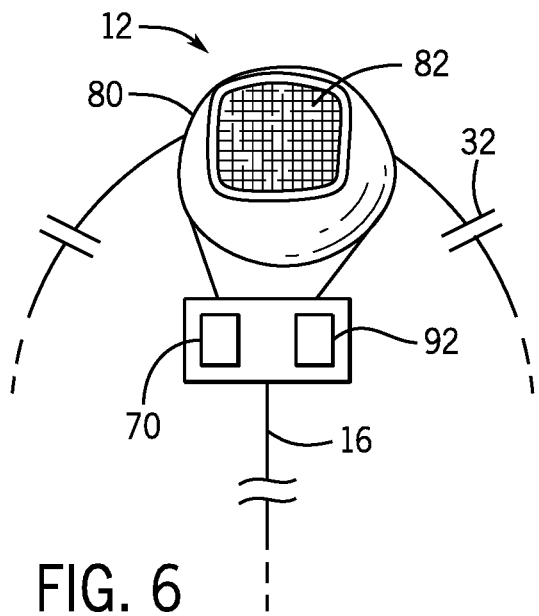
FIG. 6 is a simplified representation of a solar collector on an aerial station for conducting power to the base station.

Referring now to FIG. 6, in one embodiment, the aerial station 12, may incorporate a buoyant helium balloon 80 or the like, for example, providing a gas-impermeable insulated bag, for example, mylar, having an aluminum coating that can also serve as the capacitor plate 34. For power generation, solar cells 82 may be attached to the balloon 80 to provide the power source 44 for transmission of that power downward on the tether 16.

Figure 7:
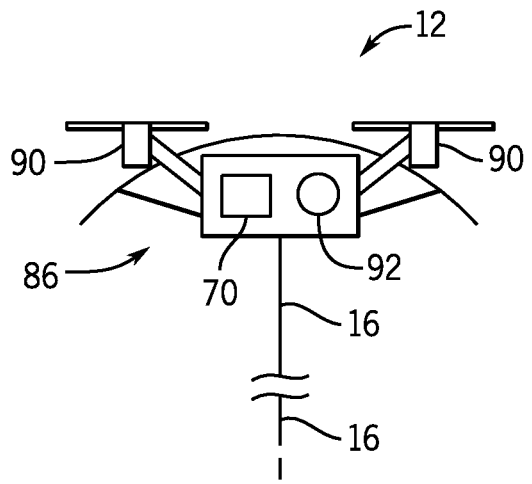
FIG. 7 is a figure similar to FIG. 6 showing a drone aerial station, for example, supporting a camera and/or radio transmitter to receive power from a base station.

In an alternative embodiment, shown in FIG. 7, the aerial station 12 may provide for a drone 86 receiving power upward through the tether 16 and providing a load 42 which converts the high-frequency, high-voltage signal to a lower voltage DC signal for powering propeller motors 90 and ancillary sensor devices 92 such as a radio transmitter or receiver camera or the like. Here the drone body or ancillary structure may provide the capacitor plate 34. It will be appreciated that these devices 92 may alternatively be supported by the balloon 80 of FIG. 6.

Figure 5:
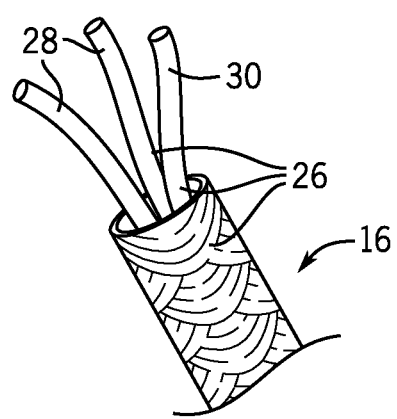
FIG. 5 is a figure similar to that of FIG. 4 showing a woven tensile tether having incorporated conductors, tensile fibers, and an optical fiber.

Referring also to FIG. 3, in the embodiments with sensor devices 92, the tether 16 may include the optical fiber 30 of FIG. 5, for example, transmitting a signal from an optical fiber transceiver 92a in the aerial station 12 to a corresponding optical fiber transceiver 92b held in the base station 14. The signal may, for example, provide an image from a camera or a radio receiver. Alternatively, the optical fiber 30 may be used to transmit data from the base station 14 to the aerial station, for example, to provide data to be transmitted or control signals or the like.

Figure 8:
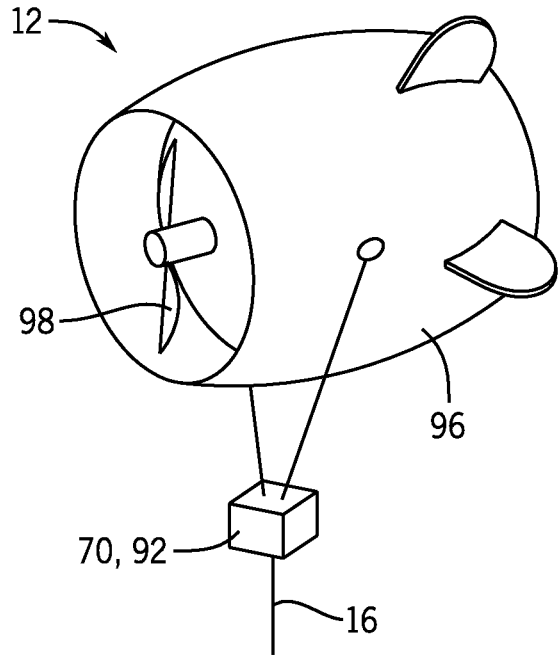
FIG. 8 is a figure similar to that of FIGS. 6 and 7 showing a wind turbine aerial station for generating power to be sent to a base station.

Referring now to FIG. 8, in an alternative embodiment, the aerial station 12 may provide for an annular, aluminized mylar balloon 96 providing a wind-focusing tunnel for supporting a propeller-driven generator 98 that can operate in the manner of the solar cells 82 to transmit power downward through the tether 16.

Figure 9:
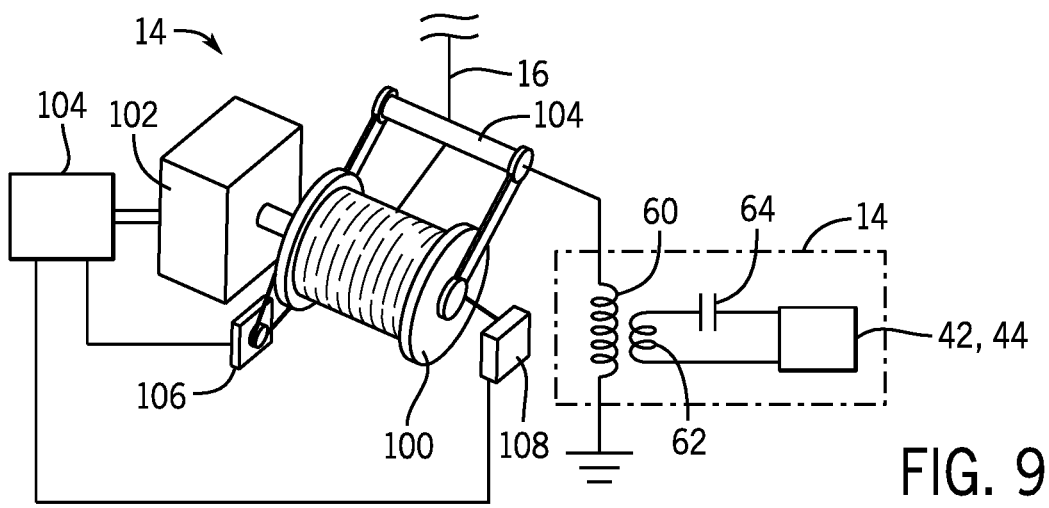
FIG. 9 is a perspective representation of the principal components of a tether spool for use with the present invention providing a conductive idler for electrical communication with a tether of variable length.

Referring now to FIG. 9, the base station 14 in one embodiment may include a spool 100 around which the tether 16 may be wound for deployment or retraction during use, for example, the spool 100 driven by a reversible motor 102. The application or extraction of power to and from the tether 16 may be done using an uninsulated tether 16, for example, as shown in FIG. 4, receiving power directly from a conductive idler 104 guiding the tether 16 as it is extracted from the spool 100. The idler 104 may apply or receive a high-voltage signal from the tether to communicate with the secondary coil 60. The idler 104 may be a roller, spring-biased against the tether 16 in the manner of a trolley mechanism or the like or may be a simple sliding brush providing electrical contact with the outer conductive element of the tether 16.

This system further provides for the ability to automatically control the tensioning on the tether 16 or an altitude of the aerial platform 12 by monitoring the amount of tether 16 unreeled from the spool 100 or by monitoring tension on the tether 16, for example, measured through the idler 104 angle. In this regard, a controller 104 may provide electrical power to the motor 102 according to an absolute encoder 106 monitoring rotations of the spool 100 (or directly measuring payout of the tether 16) for altitude control, or according to a tension monitor 108, for example, monitoring the angle of the spring-biased idler 104, for tension control, in both cases using servo control techniques known in the art.

Figure 10:
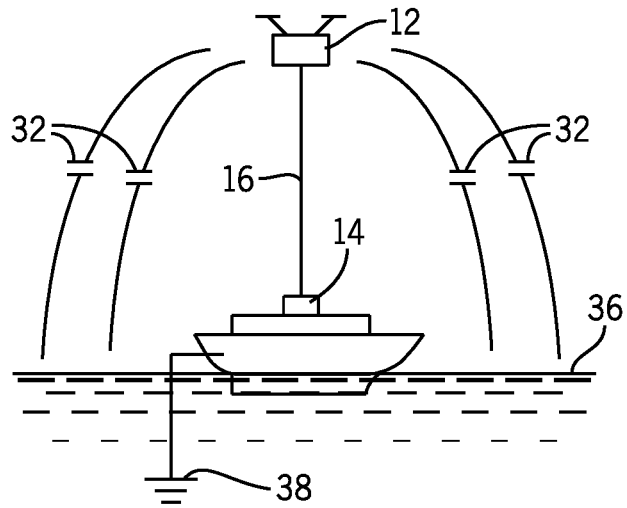
FIG. 10 is a figure similar to FIG. 6 showing an alternative ground plane, for example, using ocean water.

Referring now to FIG. 10, it will be understood generally that the ground plane 36 and, in fact, a connection to Earth, may be any broad conductive area that may be coupled to using a ground conductor 38. Thus, for example, the base station 14 may be on a boat in which case the ground plane may be water, for example, salt water, surrounding the boat providing a broad area of contact. Other ground planes can be contemplated that provide a capacitive plate area circumscribing a circular area having a diameter greater than the altitude of the aerial platform 12 for capacitive coupling 32.

Figure 11:
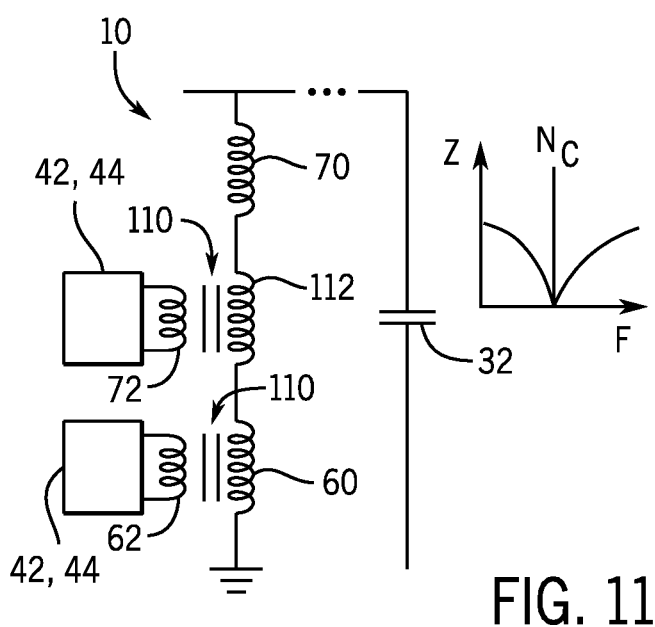
FIG. 11 is a schematic representation of an alternate design using core transformers.

Referring now to FIG. 11, the air core transformers discussed with respect to FIG. 3 (including the non-resonant air-core transformer in step-up element 50, and the air-core tap off of the Tesla coil 70 in step up element 52) can be replaced with discrete "core" transformers eliminating the large leakage reactance often associated with air-core transformers. At low frequencies (e.g., less than 1 MHz) the cores 110 can be ferrite materials and this construction can eliminate or significantly reduce the need for capacitances 74 and 64. Here, in the aerial platform 12, a primary coil 112 communicates with secondary coil 72 forming an independent non-resonant transformer spatially and electrically separate from the Tesla coil 70. Generally, the resulting circuit will be tuned to operate a frequency $\omega_c$ providing the lowest impedance for the series circuit formed by the impedance of the Tesla coil 70 and the capacitive coupling 32.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:

1. An aerial tether system comprising:
   a terrestrial station providing connection to a ground plane;

an aerial station providing self-supported flight including a supported capacitor plate structure providing a capacitively coupled path to the ground plane;

an electrical load positioned on one of the aerial station and terrestrial station;

an alternating current electrical power source positioned on another of the aerial station and terrestrial station different from the location of the electrical load; and a tether physically connecting the aerial station and terrestrial station and providing a conductor communicating therebetween;

wherein the ground plane, capacitor plate structure, conductor, electrical load, and alternating current electrical power source are interconnected to provide a continuous electrical circuit between the electrical load and electrical power source using the conductor and the capacitively coupled path.

2. The aerial tether system of claim 1 further including a voltage step-up circuit supported by the aerial station to boost the voltage between the tether and the capacitor plate structure.

3. The aerial tether system of claim 2 wherein the step-up circuit is a Tesla coil.

4. The aerial tether system of claim 3 further including a step down transformer in the aerial station to communicate with one of a load or power source.

5. The aerial tether system of claim 4 wherein the step-down transformer is one of an air core tap with the Tesla coil and a discrete core transformer having a coil in series with the Tesla coil.

6. The aerial tether system of claim 1 further including a step-up transformer at the terrestrial station providing a secondary winding communicating between the ground plane and the conductor and a primary winding communicating with one of the load and power source.

7. The aerial tether system of claim 1 wherein load is selected from the group consisting of a transmitter, receiver, an electrically driven propeller motor, and a camera.

8. The aerial tether system of claim 1 wherein the power source is selected from the group consisting of a photovoltaic array and a wind turbine.

9. The aerial tether system of claim 1 wherein the tether includes a fiber optic.

10. The aerial tether system of claim 1 wherein aerial tether system provides a voltage on the capacitor plate of at least 10,000 V.

11. The aerial tether system of claim 1 wherein the aerial tether system provides a tether voltage of at least 1000 V.

12. The aerial tether system of claim 1 wherein the aerial tether system provides power on the tether having a principal frequency component of more than 50 kHz.

13. The aerial tether system of claim 1 further including a spool and spool mechanism for wrapping and unwrapping the tether around the spool.

14. The aerial tether system of claim 13 further including an idler mechanism and wherein the tether passes across an idler mechanism after leaving the spool providing electrical connection between the tether and a stationary load or source.

15. The aerial tether system of claim 13 further including an electric motor and tension sensor operating to control a tension on the tether by control of rotation of the spool.

16. The aerial tether system of claim 1 wherein the capacitor plate structure is a metallized balloon skin.

17. The aerial tether system of claim 1 wherein the tether includes a fiber optic and the aerial station and base platform include fiber optic transceivers for communicating data over the fiber optic.

18. The aerial tether system of claim 1 wherein the tether is a composite of conductive and nonconductive materials.

19. The aerial tether system of claim 1 wherein the ground plane is a conductor adapted for electrical communication with the Earth in the vicinity of the terrestrial station.

* * * * *